US012069671B2

(12) United States Patent
Jiang et al.

(10) Patent No.: US 12,069,671 B2
(45) Date of Patent: Aug. 20, 2024

(54) METHODS, APPARATUS AND SYSTEMS FOR IMPROVING SCHEDULING FLEXIBILITY IN A WIRELESS COMMUNICATION

(71) Applicant: ZTE CORPORATION, Guangdong (CN)

(72) Inventors: Chuangxin Jiang, Guangdong (CN); Zhaohua Lu, Guangdong (CN); Hao Wu, Guangdong (CN); Bo Gao, Guangdong (CN); Shujuan Zhang, Guangdong (CN); Yu Li, Guangdong (CN); Huahua Xiao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 626 days.

(21) Appl. No.: 17/205,721

(22) Filed: Mar. 18, 2021

(65) Prior Publication Data
US 2021/0212101 A1 Jul. 8, 2021

Related U.S. Application Data

(63) Continuation of application No. PCT/CN2018/106948, filed on Sep. 21, 2018.

(51) Int. Cl.
*H04W 72/23* (2023.01)
*H04B 7/01* (2006.01)
(Continued)

(52) U.S. Cl.
CPC .............. *H04W 72/23* (2023.01); *H04B 7/01* (2013.01); *H04L 5/001* (2013.01); *H04L 5/0023* (2013.01);
(Continued)

(58) Field of Classification Search
CPC . H04W 72/23; H04W 72/0453; H04W 76/11; H04W 72/04; H04W 52/34;
(Continued)

(56) References Cited

U.S. PATENT DOCUMENTS

| 11,336,329 B2 * | 5/2022 | Liu ...................... H04L 5/0094 |
| 2010/0115367 A1 * | 5/2010 | Hsu ........................ H04L 1/189 370/336 |

(Continued)

FOREIGN PATENT DOCUMENTS

| AU | 2013211555 A1 * | 8/2013 | ........... H04L 1/0028 |
| CN | 102158971 A | 8/2011 | |

(Continued)

OTHER PUBLICATIONS

Panasonic: "PDCCH Signaling for retransmission of downlink persistent scheduling", 3GPP Draft; R1-074912, 3RD Generation Partnership Project (3GPP) Mobile Competence Centre : 650, Route Des Lucioles : F-06921 Sophia-Antipolis Cedex; vol. RAN WG1, No. Korea: Oct. 30, 2007, Oct. 30, 2007 (Oct. 30, 2007 (Year: 2007).*

(Continued)

*Primary Examiner* — Ayaz R Sheikh
*Assistant Examiner* — Louis Samara
(74) *Attorney, Agent, or Firm* — Duane Morris LLP

(57) ABSTRACT

Methods, apparatus and systems for improving scheduling flexibility in a wireless communication are disclosed. In one embodiment, a method performed by a wireless communication node is disclosed. The method includes: generating at least one indicator configured for updating scheduling information for a first transmission with a semi-persistent scheduling, the scheduling information including information related to at least one of: a sounding reference signal resource indicator, a transmission configuration indicator, (Continued)

and a timing advance; and transmitting the at least one indicator to at least one wireless communication device.

15 Claims, 15 Drawing Sheets

(51) Int. Cl.
  *H04L 5/00* (2006.01)
  *H04L 25/02* (2006.01)
  *H04W 72/0453* (2023.01)
  *H04W 72/50* (2023.01)
  *H04W 76/11* (2018.01)

(52) U.S. Cl.
  CPC ........ *H04L 5/0051* (2013.01); *H04L 25/0226* (2013.01); *H04W 72/0453* (2013.01); *H04W 72/535* (2023.01); *H04W 76/11* (2018.02)

(58) Field of Classification Search
  CPC ...... H04B 7/01; H04B 7/0417; H04B 7/0404; H04L 5/001; H04L 5/0023; H04L 5/0051; H04L 25/0226; H04L 5/0053; H04L 1/189
  See application file for complete search history.

(56) References Cited

U.S. PATENT DOCUMENTS

| | | | | |
|---|---|---|---|---|
| 2012/0309402 A1* | 12/2012 | Cheng | ................... | H04W 72/04 455/450 |
| 2018/0132212 A1* | 5/2018 | Rico Alvarino | ...... | H04L 5/0053 |
| 2019/0116608 A1* | 4/2019 | Kim | ................... | H04W 72/1263 |
| 2019/0159136 A1* | 5/2019 | MolavianJazi | ..... | H04W 52/365 |
| 2020/0053657 A1* | 2/2020 | MolavianJazi | ....... | H04L 5/0048 |

FOREIGN PATENT DOCUMENTS

| | | | | | |
|---|---|---|---|---|---|
| CN | 102307082 A | * | 1/2012 | | |
| CN | 102548011 A | * | 7/2012 | | |
| CN | 108023841 A | | 5/2018 | | |
| JP | 2019186676 A | * | 10/2019 | ........... | H04L 1/0004 |
| JP | 6961071 B2 | * | 11/2021 | ........... | H04B 7/0404 |
| TW | 1749035 B | * | 7/2017 | | |
| TW | 1749035 B | * | 12/2021 | | |
| WO | WO-2011098047 A1 | * | 8/2011 | ........... | H04B 7/0417 |
| WO | 2016105570 A1 | | 6/2016 | | |
| WO | 2017217719 A1 | | 12/2017 | | |

OTHER PUBLICATIONS

Zte et al., "Discussion on the configuration of the cell info and csi-RS-for-tracking in TCI state", 3GPP TSG-RAN WG2 Meeting #101bis, R2-1804375, Sanya, China, Apr. 20, 2018 (Apr. 20, 2018), 5 pages.

Ericsson: "Enhancement of Uplink Grant-free transmission for NR URLLC", 3GPP TSG-RAN1 Meeting #94, R1-1808149, Gothenburg, Sweden; Aug. 20, 2018-Aug. 24, 2018, Aug. 11, 2018 (Aug. 11, 2018), 8 pages.

Lenovo et al: "On eMBB/URLLC multiplexing for uplink transmission", 3GPP TSG RAN WG1 NR Ad-Hoc#2, R1-1710606, Qingdao, P.R. China; Jun. 27, 2017-Jun. 30, 2017, Jun. 26, 2017 (Jun. 26, 2017), 4 pages.

Intel Corporation: "Summary on Codebook Based UL Transmission", 3GPP TSG RAN WG1 Meeting #93, R1-1807669, Busan, Korea; May 21, 2018-May 25, 2018 May 24, 2018 (May 24, 2018), pp. 1-18.

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, vol. RAN WG2, No. VI5.1.0, Apr. 2, 2018 (Apr. 2, 2018), pp. 1-71.

* cited by examiner

METHODS, APPARATUS AND SYSTEMS FOR IMPROVING SCHEDULING FLEXIBILITY IN A WIRELESS COMMUNICATION

TECHNICAL FIELD

The disclosure relates generally to wireless communications and, more particularly, to methods, apparatus and systems for improving scheduling flexibility in a wireless communication.

BACKGROUND

Both the 4th Generation (4G) and the 5th Generation (5G) new radio (NR) mobile networks support semi-persistent scheduling, mainly for services that have a long duration and a small transmission packet, such as voice services. For downlink transmissions, an NR base station can activate a semi-persistently scheduled physical downlink shared channel (PDSCH) by using a downlink control information (DCI) scrambled by configured scheduling radio network temporary identifier (CS-RNTI). A similar method is supported for the uplink (UP) transmissions. In addition, an UL semi-persistently scheduled PUSCH can also be configured and activated by using high-layer radio resource control (RRC) signaling.

In an existing communication system, to update an indicator, e.g. a sounding reference signal resource indicator, or a transmission configuration indicator, an entire DCI needs to be re-sent. This will greatly increase an overhead of the control channel, especially for scheduling involved with multiple carrier components and/or multiple UEs. In addition, a timing offset between a DCI and its corresponding aperiodic signal is configured through a high-layer signaling in an existing communication system. When slot format changes dynamically, the timing offset configured for the aperiodic signal through the high-layer signaling may not be applicable any more. Thus, existing systems and methods for transmission scheduling are not entirely satisfactory.

SUMMARY OF THE INVENTION

The exemplary embodiments disclosed herein are directed to solving the issues relating to one or more of the problems presented in the related art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method includes: generating at least one indicator configured for updating scheduling information for a first transmission with a semi-persistent scheduling, the scheduling information including information related to at least one of: a sounding reference signal resource indicator, a transmission configuration indicator, and a timing advance; and transmitting the at least one indicator to at least one wireless communication device.

In another embodiment, a method performed by a wireless communication node is disclosed. The method includes: configuring a set of first timing offsets each of which corresponds to one of a set of slot format configurations; and transmitting, to a wireless communication device, indication information that indicates both a slot format configuration from the set of slot format configurations and a first timing offset corresponding to the slot format configuration from the set of first timing offsets, and the first timing offset is configured for a transmission of at least one aperiodic signal.

In yet another embodiment, a method performed by a wireless communication node is disclosed. The method includes: configuring a synchronization signal that provides quasi co-location (QCL) information to a reference signal for tracking, the QCL information including at least one of: Doppler shift and average delay; and transmitting the reference signal to a wireless communication device, and the synchronization signal and the reference signal are transmitted on different frequency ranges.

In still another embodiment, a method performed by a wireless communication device is disclosed. The method includes: receiving at least one indicator from a wireless communication node; and updating, based on the at least one indicator, scheduling information for a first transmission with a semi-persistent scheduling, the scheduling information including information related to at least one of: a sounding reference signal resource indicator, a transmission configuration indicator, and a timing advance.

In a different embodiment, a method performed by a wireless communication device is disclosed. The method includes: determining a set of first timing offsets each of which corresponds to one of a set of slot format configurations; and receiving, from a wireless communication node, indication information that indicates both a slot format configuration from the set of slot format configurations and a first timing offset corresponding to the slot format configuration from the set of first timing offsets. The first timing offset is configured for a transmission of at least one aperiodic signal.

In another embodiment, a method performed by a wireless communication device is disclosed. The method includes: receiving a synchronization signal and a reference signal from a wireless communication node; and determining, based on the synchronization signal, quasi co-location (QCL) information to the reference signal for tracking, the QCL information including at least one of: Doppler shift and average delay, and the synchronization signal and the reference signal are transmitted on different frequency ranges.

In a different embodiment, a wireless communication node configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
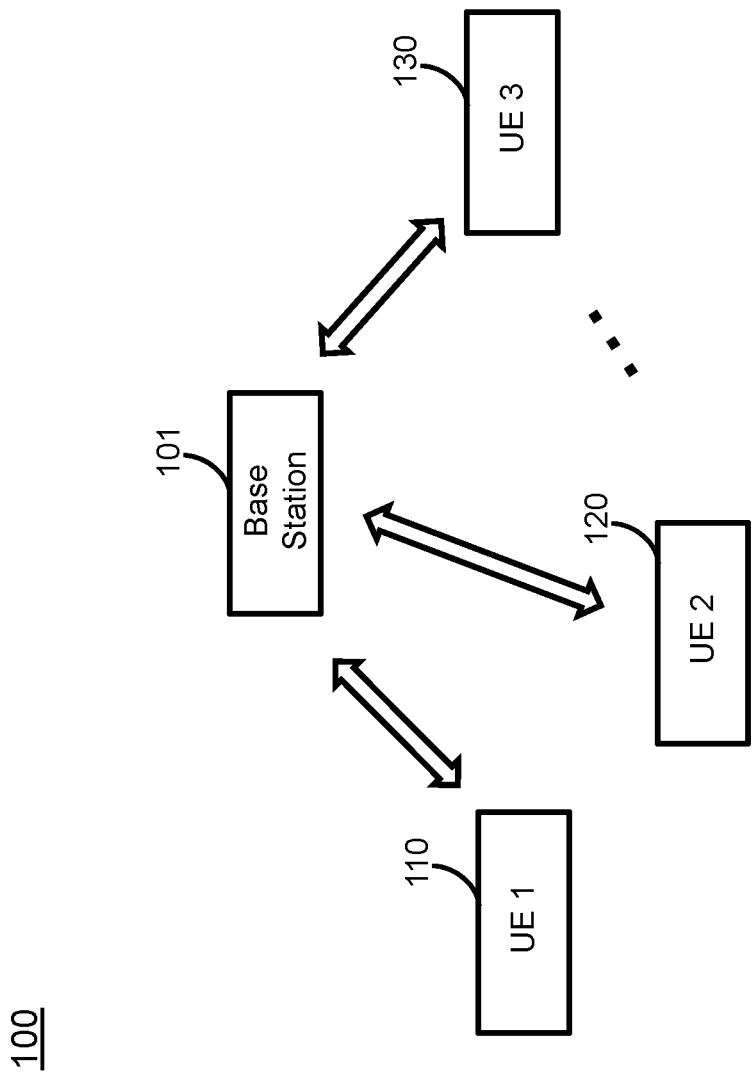
FIG. 1 illustrates an exemplary communication network in which techniques disclosed herein may be implemented, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

The present disclosure provides systems and methods for improving scheduling flexibility in a wireless communication. In one embodiment, a downlink control information (DCI) signal that schedules a transmission with a non-semi-persistent scheduling, e.g. dynamic scheduling, is also configured for updating scheduling information of another transmission with a semi-persistent scheduling. In addition, the SRS resource indicator (SRI) or transmission configuration indicator (TCI) of DCI on multiple carrier components and/or for multiple UEs may be jointly updated, which effectively saves the overhead of the control channel.

When a slot format changes dynamically, the timing offset configured for the aperiodic signal through the high-layer signaling is no longer applicable. In one embodiment, for each of a set of slot format configurations, a corresponding timing offset is configured for the aperiodic signal. As the slot format configuration is updated, the corresponding timing offset is updated accordingly. That is, the timing offset changes following the change of the slot format, which greatly enhances the scheduling flexibility without increasing the DCI overhead.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes;" and a UE may be described herein as non-limiting examples of "wireless communication devices." The BS and UE can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with some embodiments of the present disclosure. As shown in FIG. 1, the exemplary communication network 100 includes a base station (BS) 101 and a plurality of UEs, UE 1 110, UE 2 120 ... UE 3 130, where the BS 101 can communicate with the UEs according to wireless protocols.

In one embodiment, the BS 101 can activate a semi-persistently scheduled physical downlink shared channel (PDSCH) by using a DCI scrambled by configured scheduling radio network temporary identifier (CS-RNTI), and use a high-layer radio resource control (RRC) signaling to configure a period, a number of hybrid automatic repeat request (HARQ) processes, and/or physical uplink control channel (PUCCH) resources of the semi-persistently scheduled PDSCH for a UE, e.g. the UE 1 110. Other scheduling information may be notified by a DCI, e.g. using DCI format 1_1 to notify time-frequency domain resources, modulation coding scheme (MCS), demodulation reference signal (DMRS) port number, TCI, etc.

Figure 2:
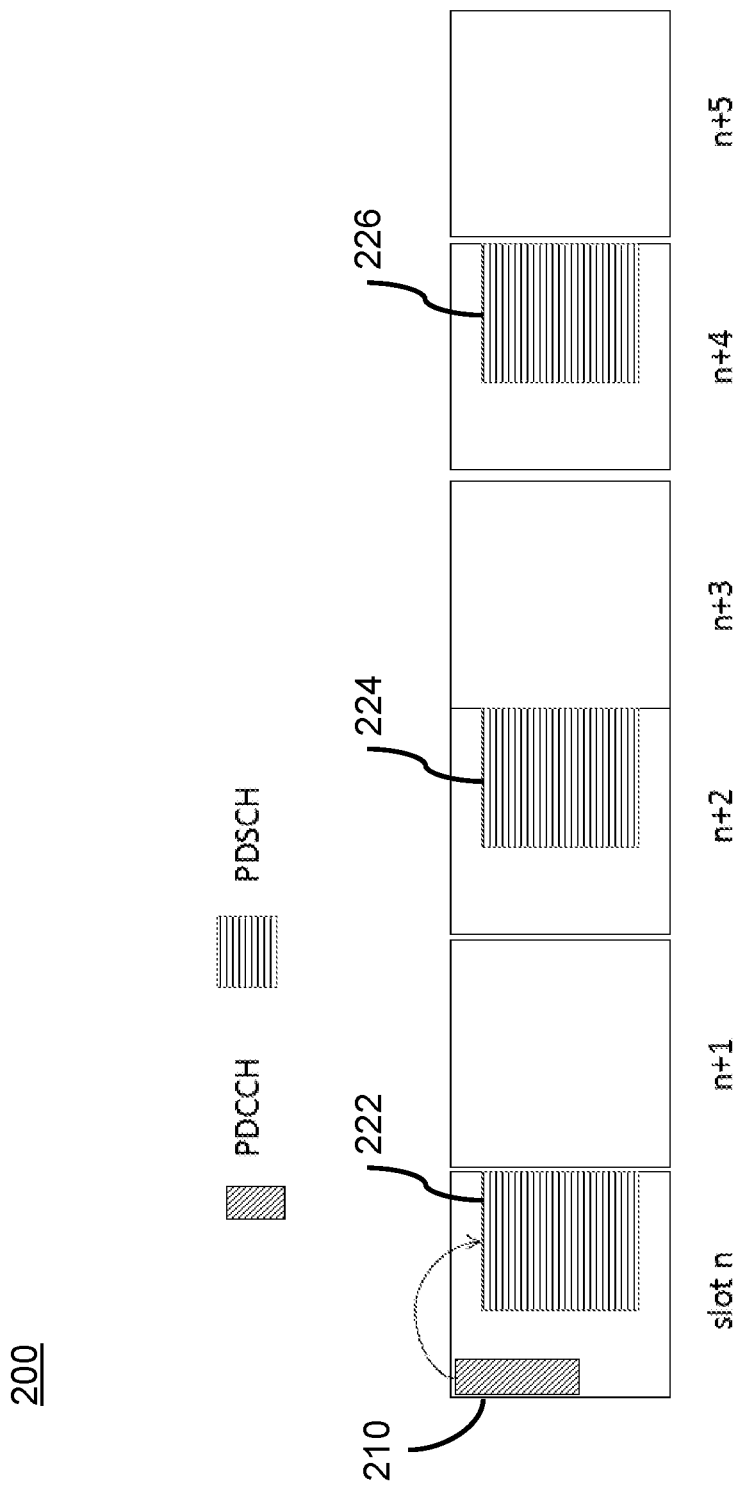
FIG. 2 illustrates an exemplary mechanism for semi-persistent scheduling, in accordance with some embodiments of the present disclosure.

At the receiver side, the UE uses the CS-RNTI to detect the DCI. FIG. 2 illustrates an exemplary mechanism 200 for semi-persistent scheduling, in accordance with some embodiments of the present disclosure. As shown in FIG. 2, when the UE detects the DCI on physical downlink control channel (PDCCH) 210, the DCI activates the semi-persistent PDSCH transmission. Then, the UE receives the PDSCH 222, 224, 226 semi-persistently according to the scheduling information configured by the RRC and the DCI, without a need of an additional PDCCH to schedule each subsequent PDSCH.

A similar method may be supported for the uplink transmissions. That is, the CS-RNTI scrambled DCI may be used to trigger a semi-persistent PUSCH transmission, which may be called a type 2 of semi-persistent PUSCH scheduling. In addition, for the type 1 of semi-persistent PUSCH scheduling, the DCI is not required to activate the semi-persistent PUSCH. The semi-persistent PUSCH is activated by RRC signaling; and all the scheduling parameters are all configured by RRC signaling.

Figure 3:
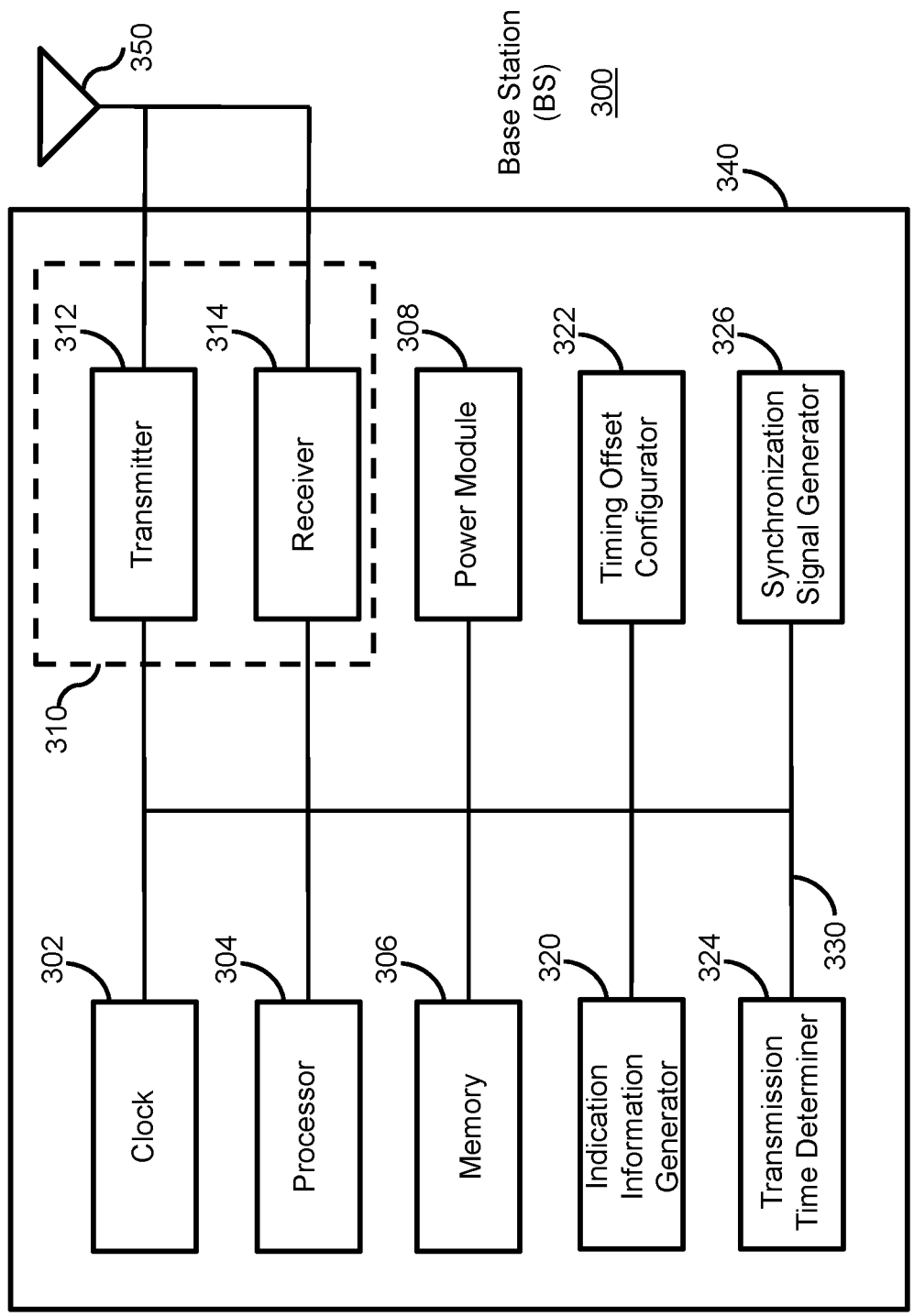
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 including a transmitter 312 and receiver 314, a power module 308, an indication information generator 320, a timing offset configurator 322, a transmission time determiner 324, a synchronization signal generator 326.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 serving a UE, a semi-persistent scheduling may be activated for services that have a long duration and a small transmission packet, such as voice services. The BS 300 may configure scheduling information for transmissions between the BS 300 and the UE with the semi-persistent scheduling.

The indication information generator 320 in this example may generate at least one indicator configured for updating at least one of following scheduling information for a first transmission with a semi-persistent scheduling: SRI, TCI and timing advance (TA), and transmit, via the transmitter 312, the at least one indicator to at least one UE. In one embodiment, the at least one indicator is carried by a physical downlink control channel signal that schedules a second transmission with a non-semi-persistent scheduling, e.g. a dynamic scheduling. The at least one indicator may be further configured for updating scheduling information for the second transmission. In one embodiment, the first transmission and the second transmission are in a same carrier component (CC) and/or a same bandwidth part (BWP).

In one embodiment, the indication information generator 320 may transmit, via the transmitter 312, a dedicated channel signaling to carry a plurality of indicators to a plurality of UEs. At least one of the plurality of indicators is configured for each of the plurality of UEs. The dedicated channel signaling may be a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

In another embodiment, the indication information generator 320 may transmit, via the transmitter 312, a dedicated channel signaling to carry a plurality of indicators for updating scheduling information for a plurality of data transmissions. Resources of at least two of the plurality of data transmissions are on different CCs and/or (BWPs. The dedicated channel signaling may be a DCI that is scrambled by at least one of: a CS-RNTI, a C-RNTI, a SP-CSI-RNTI, and a newly defined dedicated RNTI.

The timing offset configurator 322 in this example may configure a set of first timing offsets each of which corresponds to one of a set of slot format configurations. The timing offset configurator 322 may inform the indication information generator 320 about the timing offset configurations and the slot format configurations. Based on the configurations, the indication information generator 320 can generate indication information that indicates both a slot format configuration from the set of slot format configurations and a first timing offset corresponding to the slot format configuration from the set of first timing offsets. The first timing offset is configured for a transmission of at least one aperiodic signal. The indication information generator 320 may then transmit, via the transmitter 312, the indication information to the UE. In one embodiment, the indication information is transmitted based on a control channel signal whose DCI format usually is a "format 2_0".

In one embodiment, the set of first timing offsets are configured for transmissions of a plurality of aperiodic signals. In one embodiment, the set of first timing offsets includes at least one of: a first set of first timing offsets for transmissions of a plurality of uplink aperiodic signals; and a second set of first timing offsets for transmissions of a plurality of downlink aperiodic signals.

The timing offset configurator 322 may inform the transmission time determiner 324 about the first timing offset for determining a transmission time of the at least one aperiodic signal. In one embodiment, the transmission time determiner 324 in this example determines a transmission time of the at least one aperiodic signal based on the first timing offset corresponding to the slot format configuration. In another embodiment, the transmission time determiner 324 in this example configures a second timing offset for an aperiodic signal based on a high-layer signaling and informs the transmission time determiner 324 about the second timing offset. The transmission time determiner 324 may determine a transmission time of the aperiodic signal based on both the first timing offset corresponding to the slot format configuration and the second timing offset.

The synchronization signal generator 326 in this example may configure a synchronization signal, e.g. via a physical broadcast channel (PBCH), that provides quasi co-location (QCL) information to a reference signal, e.g. a channel state information reference signal (CSI-RS), for tracking. The QCL information includes at least one of: Doppler shift and average delay. The synchronization signal generator 326 may transmit, via the transmitter 312, the reference signal to a UE. The synchronization signal and the reference signal are transmitted on different frequency ranges, e.g. on different CCs and/or different BWPs.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the indication information generator 320. Conversely, each of the modules illustrated in FIG. 3 can be implemented using a plurality of separate components or elements.

Figure 4A:
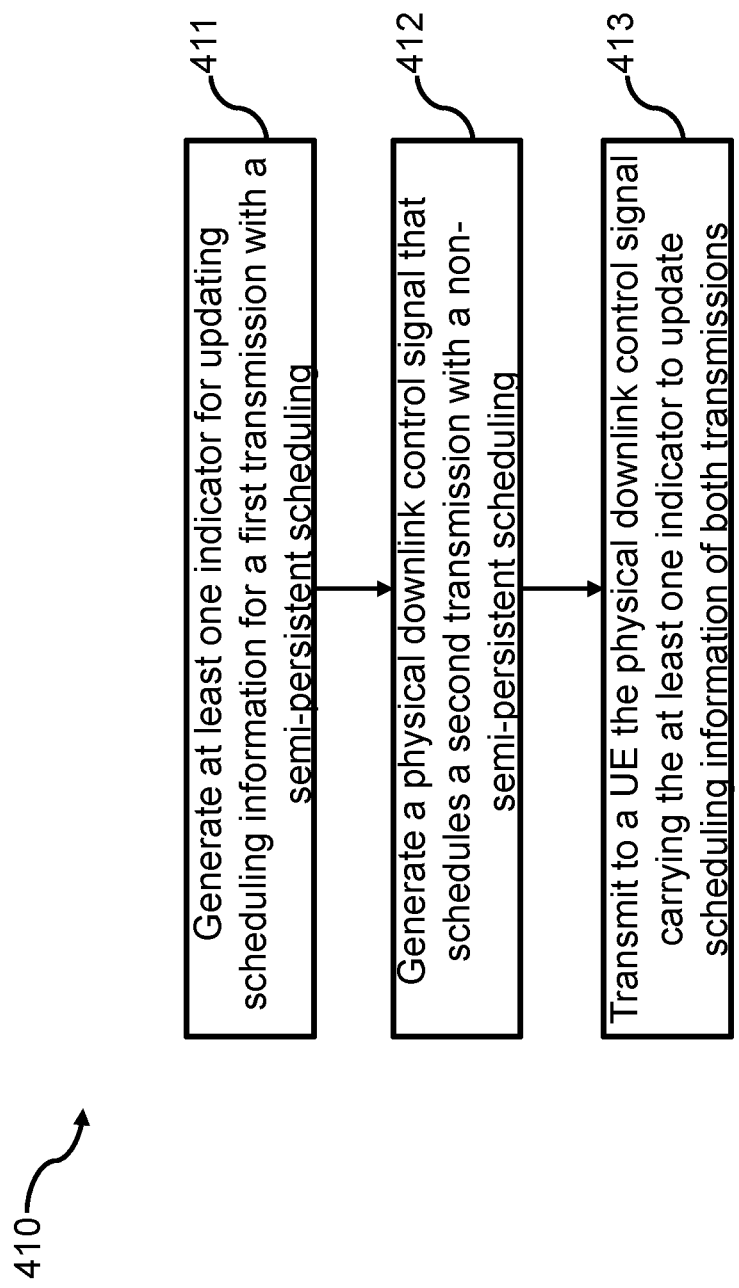
FIG. 4A illustrates a flow chart for a method performed by a BS for improving scheduling flexibility, in accordance with some embodiments of the present disclosure.

FIG. 4A illustrates a flow chart for a method 410 performed by a BS, e.g. the BS 300 in FIG. 3, for improving scheduling flexibility, in accordance with some embodiments of the present disclosure. At operation 411, the BS generates at least one indicator for updating scheduling information for a first transmission with a semi-persistent scheduling. At operation 412, the BS generates a physical downlink control signal that schedules a second transmission with a non-semi-persistent scheduling. At operation 413, the BS transmits to a UE the physical downlink control signal carrying the at least one indicator to update scheduling information of both transmissions.

Figure 4B:
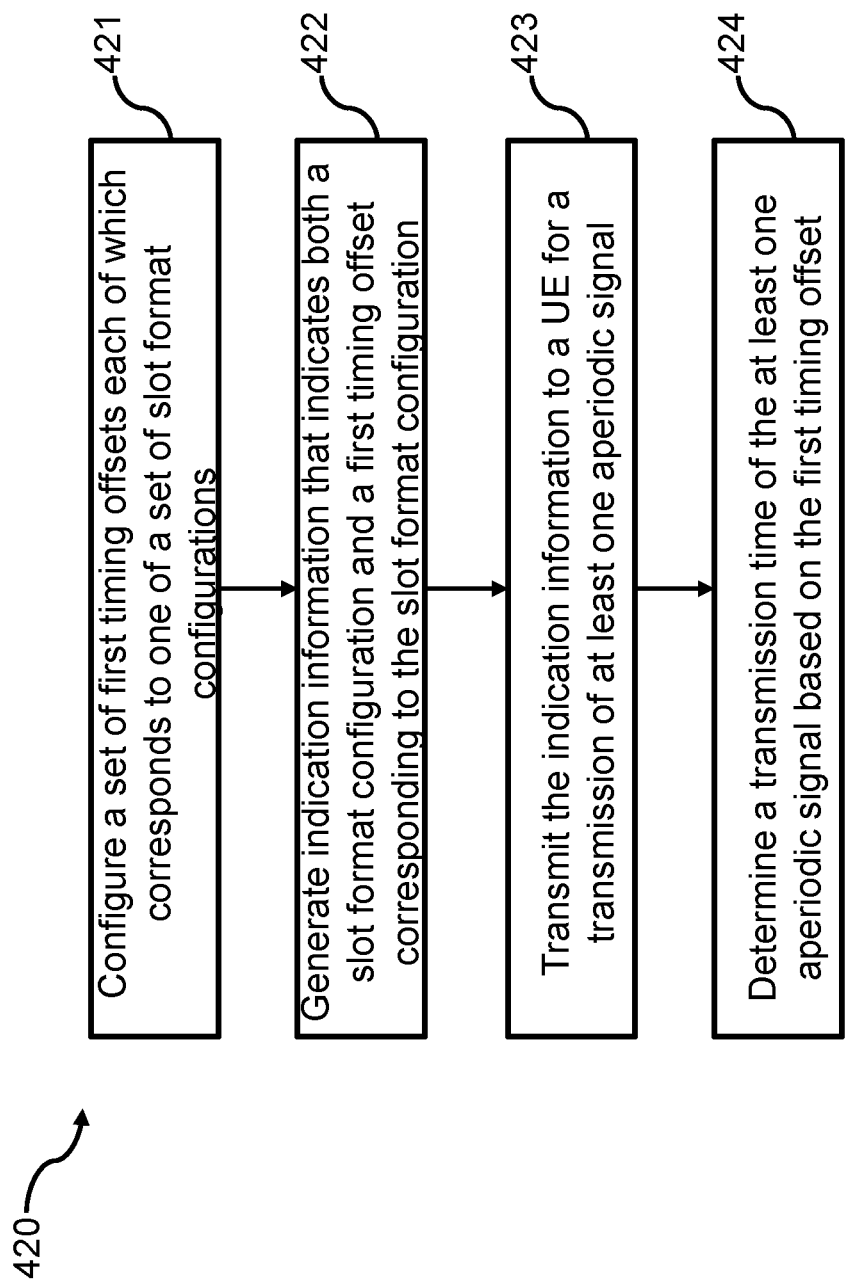
FIG. 4B illustrates a flow chart for another method performed by a BS for improving scheduling flexibility, in accordance with some embodiments of the present disclosure.

FIG. 4B illustrates a flow chart for another method 420 performed by a BS, e.g. the BS 300 in FIG. 3, for improving scheduling flexibility, in accordance with some embodiments of the present disclosure. At operation 421, the BS configures a set of first timing offsets each of which corresponds to one of a set of slot format configurations. At operation 422, the BS generates indication information that indicates both a slot format configuration and a first timing offset corresponding to the slot format configuration. At operation 423, the BS transmits the indication information to a UE for a transmission of at least one aperiodic signal. At operation 424, the BS determines a transmission time of the at least one aperiodic signal based on the first timing offset.

Figure 5:
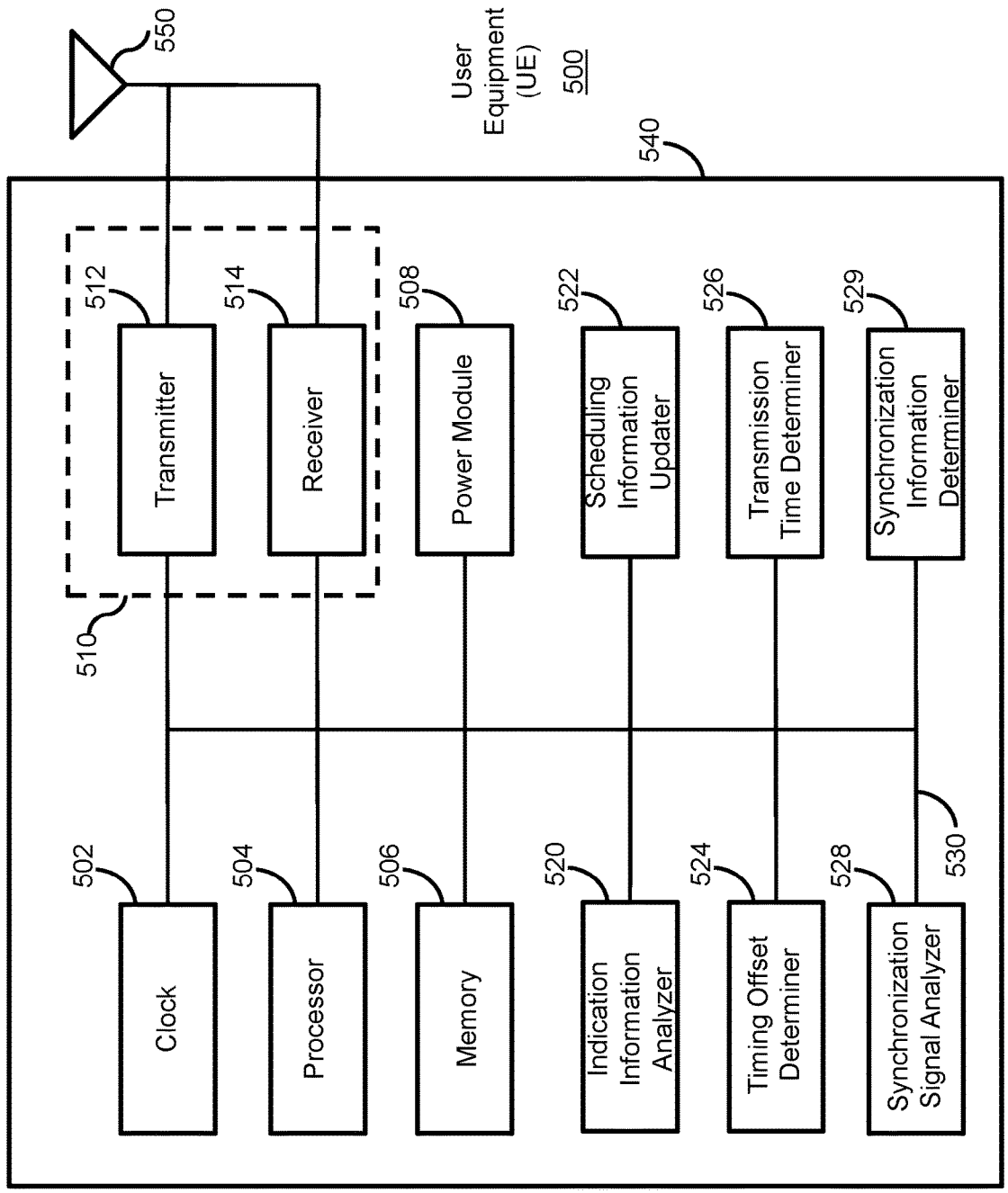
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 including a transmitter 512 and a receiver 514, a power module 508, an indication information analyzer 520, a scheduling information updater 522, a timing offset determiner 524, a transmission time determiner 526, a synchronization signal analyzer 528, and a synchronization information determiner 529.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 440 and electrically coupled to the transceiver 510.

In a communication system, the UE 500 may be associated with a BS. For example, the UE 500 may be served by the BS with a semi-persistent scheduling. The indication information analyzer 520 in this example may receive, via the receiver 514, at least one indicator from the BS. In one embodiment, the at least one indicator is carried by a physical downlink control channel signal that schedules a second transmission with a non-semi-persistent scheduling, e.g. a dynamic scheduling.

The indication information analyzer 520 may inform the scheduling information updater 522 about the at least one indicator for updating scheduling information. In one embodiment, the scheduling information updater 522 may update, based on the at least one indicator, at least one of following scheduling information for a first transmission with a semi-persistent scheduling: SRI, TCI, and TA. In another embodiment, the scheduling information updater 522 may update, based on the at least one indicator, scheduling information for the second transmission. The first transmission and the second transmission are in a same CC and/or a same BWP.

In one embodiment, the indication information analyzer 520 may receive, via the receiver 514, a dedicated channel signaling that carries a plurality of indicators for a plurality of UEs. At least one of the plurality of indicators is configured for each of the plurality of UEs. The dedicated channel signaling may be a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

In another embodiment, the indication information analyzer 520 may receive, via the receiver 514, a dedicated channel signaling that carries a plurality of indicators for updating scheduling information for a plurality of data transmissions. Resources of at least two of the plurality of data transmissions are on different CCs and/or (BWPs. The dedicated channel signaling may be a DCI that is scrambled by at least one of: a CS-RNTI, a C-RNTI, a SP-CSI-RNTI, and a newly defined dedicated RNTI.

The timing offset determiner 524 in this example may determine a set of first timing offsets each of which corresponds to one of a set of slot format configurations. The indication information analyzer 520 may receive, via the receiver 514 from the BS, indication information that indicates both a slot format configuration from the set of slot format configurations and a first timing offset corresponding to the slot format configuration from the set of first timing offsets. The first timing offset is configured for a transmission of at least one aperiodic signal. In one embodiment, the indication information is received based on a control channel signal whose DCI format is a "format 2_0".

In one embodiment, the set of first timing offsets are configured for transmissions of a plurality of aperiodic signals. In one embodiment, the set of first timing offsets includes at least one of: a first set of first timing offsets for transmissions of a plurality of uplink aperiodic signals; and a second set of first timing offsets for transmissions of a plurality of downlink aperiodic signals.

The timing offset determiner 524 may inform the transmission time determiner 526 about the first timing offset for determining a transmission time of the at least one aperiodic signal. In one embodiment, the transmission time determiner 526 in this example determines a transmission time of the at least one aperiodic signal based on the first timing offset corresponding to the slot format configuration. In another embodiment, the timing offset determiner 524 in this example receives, via the receiver 514 from the BS, a high-layer signaling that indicates a second timing offset for an aperiodic signal and informs the transmission time determiner 526 about the second timing offset. The transmission time determiner 526 may determine a transmission time of the aperiodic signal based on both the first timing offset corresponding to the slot format configuration and the second timing offset.

The synchronization signal analyzer 528 in this example may receive, via the receiver 514 from the BS, a reference signal and a synchronization signal, e.g. via a physical broadcast channel (PBCH). The synchronization signal analyzer 528 may analyze the synchronization signal and inform the synchronization information determiner 529 about the synchronization signal. The synchronization information determiner 529 in this example determines, based on the synchronization signal, quasi co-location (QCL) information to the reference signal, e.g. a channel state information reference signal (CSI-RS), for tracking. The QCL information includes at least one of: Doppler shift and average delay. In one embodiment, the synchronization signal and the reference signal are transmitted on different frequency ranges, e.g. on different CCs and/or different BWPs.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the indication information analyzer 520. Conversely, each of the modules illustrated in FIG. 5 can be implemented using a plurality of separate components or elements.

Figure 6A:
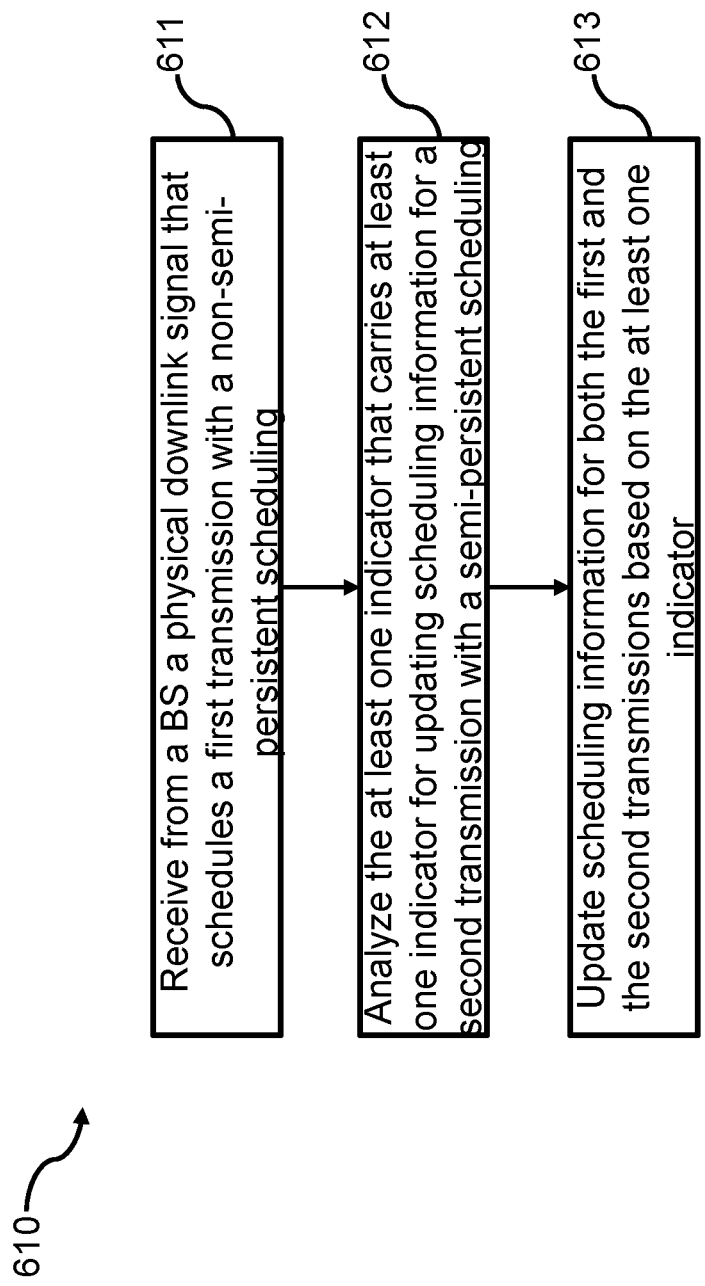
FIG. 6A illustrates a flow chart for a method performed by a UE for improving scheduling flexibility, in accordance with some embodiments of the present disclosure.

FIG. 6A illustrates a flow chart for a method 610 performed by a UE, e.g. the UE 500 in FIG. 5, for improving scheduling flexibility, in accordance with some embodiments of the present disclosure. At operation 611, the UE receives from a BS a physical downlink signal that schedules a first transmission with a non-semi-persistent scheduling. At operation 612, the UE analyzes the at least one indicator that carries at least one indicator for updating scheduling information for a second transmission with a semi-persistent scheduling. At operation 613, the UE updates scheduling information for both the first and the second transmissions based on the at least one indicator.

Figure 6B:
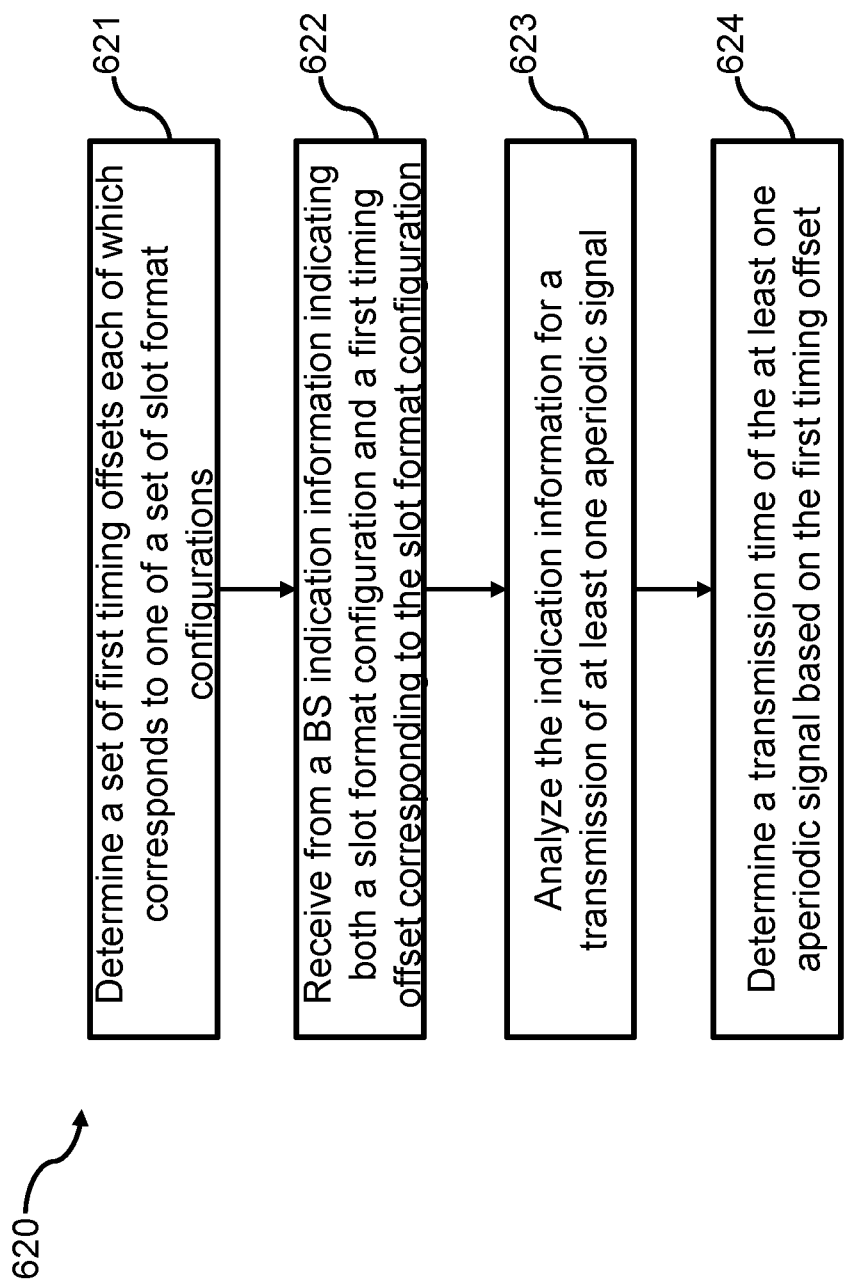
FIG. 6B illustrates a flow chart for another method performed by a UE for improving scheduling flexibility, in accordance with some embodiments of the present disclosure.

FIG. 6B illustrates a flow chart for another method 620 performed by a UE, e.g. the UE 500 in FIG. 5, for improving scheduling flexibility, in accordance with some embodiments of the present disclosure. At operation 621, the UE determines a set of first timing offsets each of which corresponds to one of a set of slot format configurations. At operation 622, the UE receives from a BS indication information indicating both a slot format configuration and a first timing offset corresponding to the slot format configuration. At operation 623, the UE analyzes the indication information for a transmission of at least one aperiodic signal. At operation 624, the UE determines a transmission time of the at least one aperiodic signal based on the first timing offset.

Different embodiments of the present disclosure will now be described in detail hereinafter. It is noted that the features of the embodiments and examples in the present disclosure may be combined with each other in any manner without conflict.

In a first embodiment, within a BWP, if the UE is configured with uplink (UL) semi-persistent scheduling, such as semi-persistent scheduling type 2, then after detecting a UL DCI grant scrambled with CS-RNTI, the UE semi-persistently transmits the PUSCH according to the PUSCH period configured by a high-layer signaling, based on the scheduling information in the DCI and the scheduling parameters in high-layer configuration. Generally, if the base station does not need to update the scheduling information, then the DCI does not need to be sent. The UE may always transmit the PUSCH according to the indication in the latest DCI. However, if the channel condition of the UE changes and the base station wants to update the scheduling information of the PUSCH, the base station needs to retransmit a DCI, such as DCI format 0_0 or 0_1. Then the UE will send the PUSCH according to the scheduling information indicated by the latest DCI.

Figure 7:
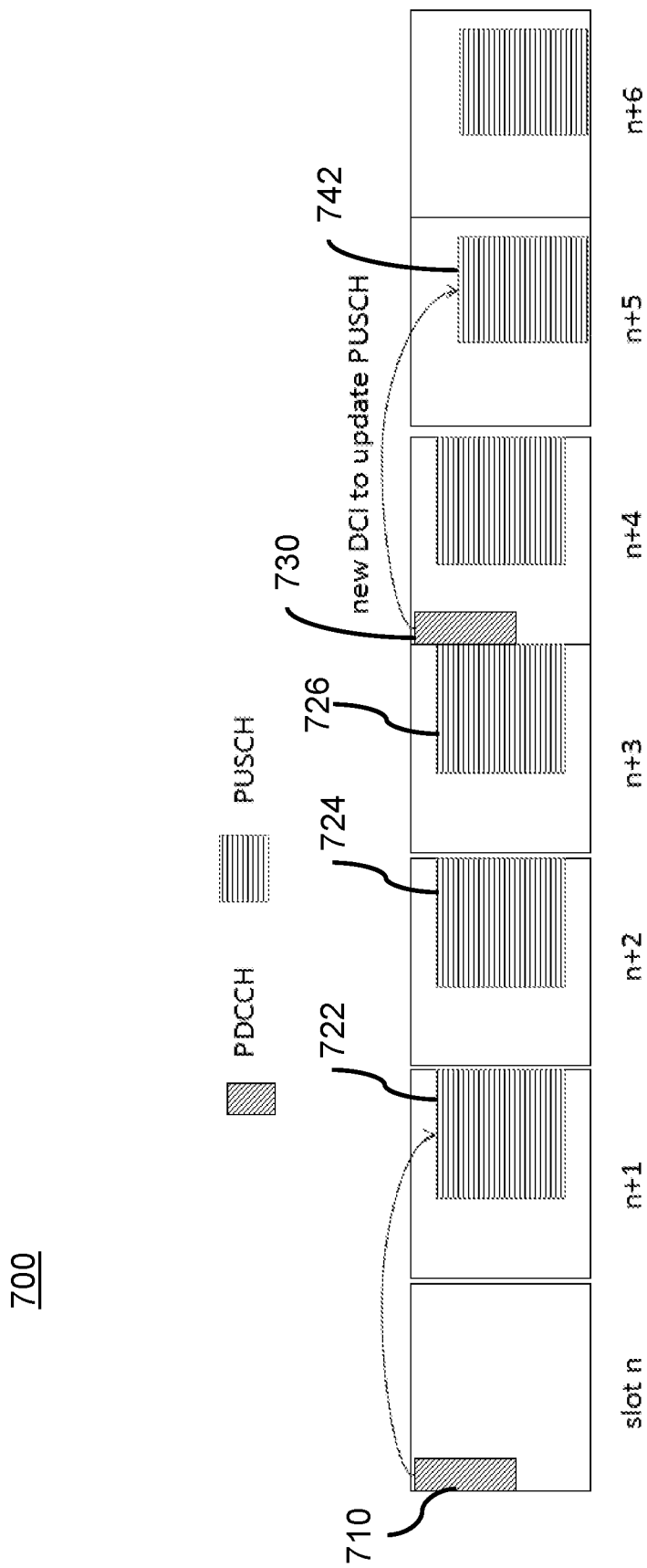
FIG. 7 illustrates an exemplary method for semi-persistent scheduling triggered by downlink control information (DCI), in accordance with some embodiments of the present disclosure.

FIG. 7 illustrates an exemplary method 700 for semi-persistent scheduling triggered by DCI, in accordance with some embodiments of the present disclosure. As shown in FIG. 7, the base station uses the DCI on a PDCCH 710 at time n, to trigger the transmission of the semi-persistent PUSCH. Then the UE transmits the PUSCH 722, 724, 726, at slot n+1, n+2, n+3 according to the scheduling information indicated by the DCI on the slot n. It is assumed that the period is 1 slot. The scheduling information in the DCI includes DMRS port, SRI, MCS and other indication information included in the DCI format 0_0 or 0_1. Over time, if the channel conditions of the UE change, the base station can resend a new DCI 730 on slot n+4 to update the scheduling indication information, e.g. to update the SRI.

At high frequencies, the base station dynamically notifies the UE about the transmission beam of the PUSCH by the SRI in the DCI. In one embodiment, the transmission beam of the PUSCH and the transmission beam of the SRS resource indicated by the SRI are the same. Due to the instability of the channel conditions at high frequencies, the beam direction of the PUSCH transmitted by the UE may need to be dynamically changed. For example, if there is a passer-by blocking between the base station and the UE and the original beam is blocked by the passer-by, then a new beam may be used to transmit the PUSCH. Since the change is dynamic, the base station may need to send a complete DCI every time the SRI needs to be updated, even if other information, such as MCS, DMRS port, HARQ process number, time-frequency domain resource information, etc., does not need to be updated. This can cause a waste of the PDCCH, i.e., increasing the overhead of the PDCCH and thereby deviating from the purpose of semi-persistent scheduling. One solution is that: for uplink semi-persistent scheduling, the base station updates the SRI by means of dynamic indication, where the dynamic indication is not via a semi-persistently scheduled DCI.

Specifically, the base station may update the semi-persistently scheduled SRI in a field of the DCI that is not semi-persistently scheduled. According to one solution, the SRI of the semi-persistently scheduled PUSCH is the same as the SRI of the dynamically scheduled PUSCH on the same CC or the same BWP. Generally, this dynamically scheduled PUSCH refers to a PUSCH scheduled by a C-RNTI scrambled DCI, such as an SRI included in the DCI format 0_1 scrambled by C-RNTI. In other words, the SRI of the semi-persistently scheduled PUSCH is the SRI of the PUSCH scheduled in the DCI format 0_1 scrambled with the C-RNTI. That is, the base station utilizes the SRI field in the DCI format 0_1 scrambled by the C-RNTI to simultaneously notify the PUSCH scheduled by the DCI and update the beam information of the PUSCH with the semi-persistent scheduling. In this case, the two PUSCHs are in the same CC or same BWP. After receiving the C-RNTI scrambled DCI, the SRI of the semi-persistently scheduled PUSCH is also updated.

Figure 8:
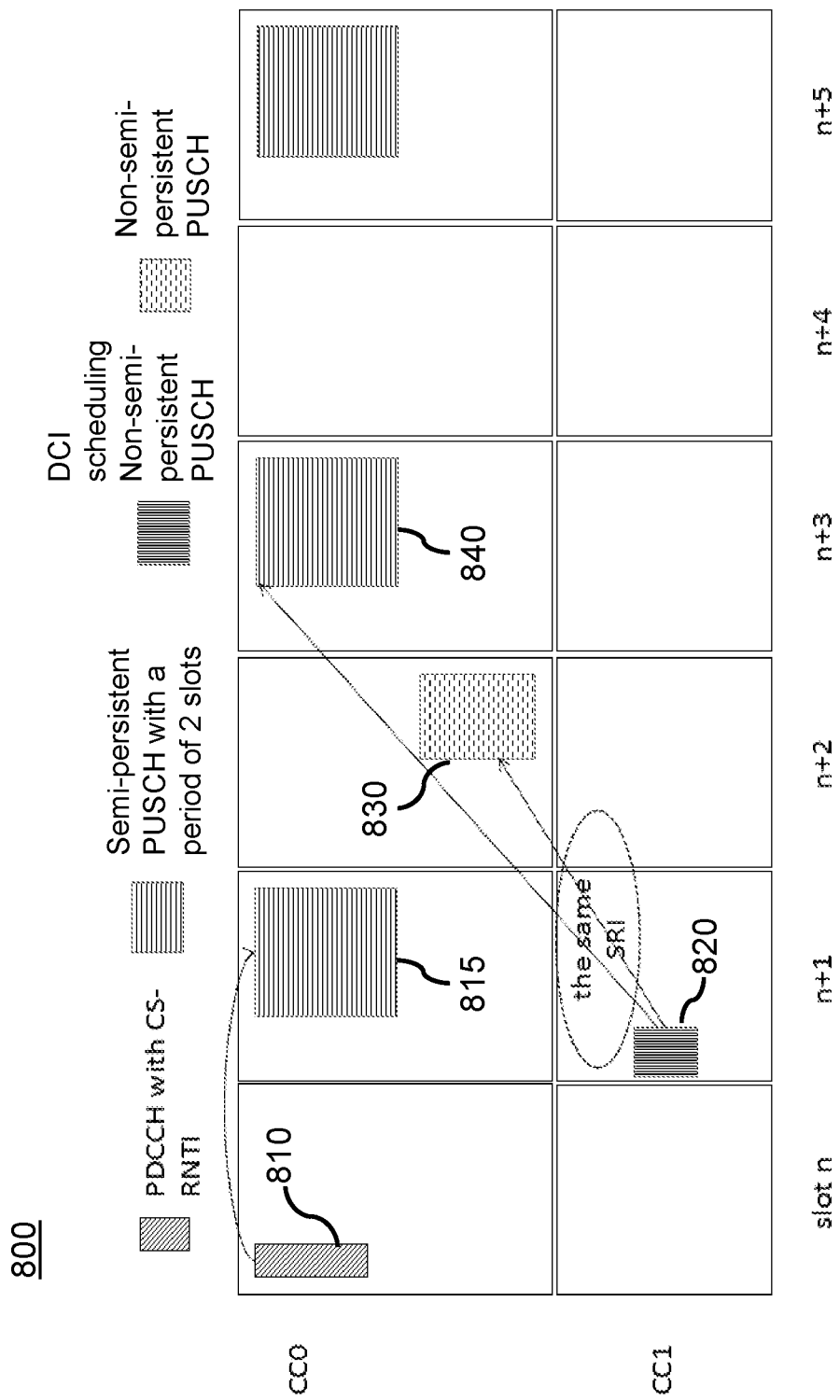
FIG. 8 illustrates an exemplary method for indicating sounding reference signal (SRS) resource indicator of a semi-persistent scheduling based on a DCI of a non-semi-persistent scheduling, in accordance with some embodiments of the present disclosure.

FIG. 8 illustrates an exemplary method 800 for indicating SRI of a semi-persistent scheduling based on a DCI of a non-semi-persistent scheduling, in accordance with some embodiments of the present disclosure. As shown in FIG. 8, after receiving the C-RNTI scrambled DCI 820 on slot n+1, the UE demodulated the DCI, and simultaneously applied the SRI field included in the DCI to the non-semi-persistently or dynamically scheduled PUSCH 830 and the semi-persistently scheduled PUSCH 840. The semi-persistently scheduled PUSCH after slot n+2 uses the SRI notified by the DCI. That is, the beam information of the semi-persistent PUSCHs on slot n+3 and slot n+5 refers to the SRI in the DCI scrambled by the C-RNTI. After receiving the dynamically scheduled DCI, the UE may need to wait for a period of time before applying the SRI carried by the DCI to update the SRI of the semi-persistent PUSCH. The period of time may be used for demodulating the DCI.

Alternatively, the base station can add one or more bits to the C-RNTI scrambled DCI. The at least one bit may be used to update the PUSCH in the DCI scrambled by the CS-RNTI corresponding to the BWP or CC. Further, the base station can add a few bits in the DCI format 0_1 to update the SRI information of the semi-persistently scheduled PUSCH in the corresponding BWP or CC. The corresponding BWP or CC here means that: the BWP or CC where the PUSCH scheduled by the DCI format 0_1 is located is the same as the BWP or CC where the semi-persistent PUSCH is located; or the BWP or CC where the DCI format 0_1 is located is the same as the BWP or CC where the semi-persistent PUSCH is located. Optionally, the base station may add a few bits in the DCI format 1_1 to update the SRI information of the semi-persistently scheduled PUSCH in the corresponding BWP or CC. However, when the base station does not need to use DCI format 0_1 or 1_1 to schedule data, using this DCI to update the SRI of the semi-persistently scheduled PUSCH also causes a great waste.

In addition, when a semi-persistently scheduled PUSCH is configured on multiple CCs of a user, or when multiple users are configured with a semi-persistently scheduled PUSCH, due to the change of SRI, the base station re-triggers a semi-persistent scheduled DCI for each PUSCH to update only the SRI in the scheduling information, which will greatly increase the overhead of DCI. In one embodiment, a method for updating beam information in semi-persistent scheduling is to jointly notify a user of SRI information of semi-persistent scheduling in multiple CCs and/or BWPs, or to jointly notify multiple users of SRI information of semi-persistent scheduling in one CC and/or BWP; or to jointly notify multiple users of SRI information of semi-persistent scheduling in multiple CC/BWPs. The joint notification may be based on a group common DCI. In other words, one common or public DCI may be used to jointly notify one or more users of SRI information in semi-persistent scheduling on one or more CCs and/or one or more BWPs.

Figure 9:
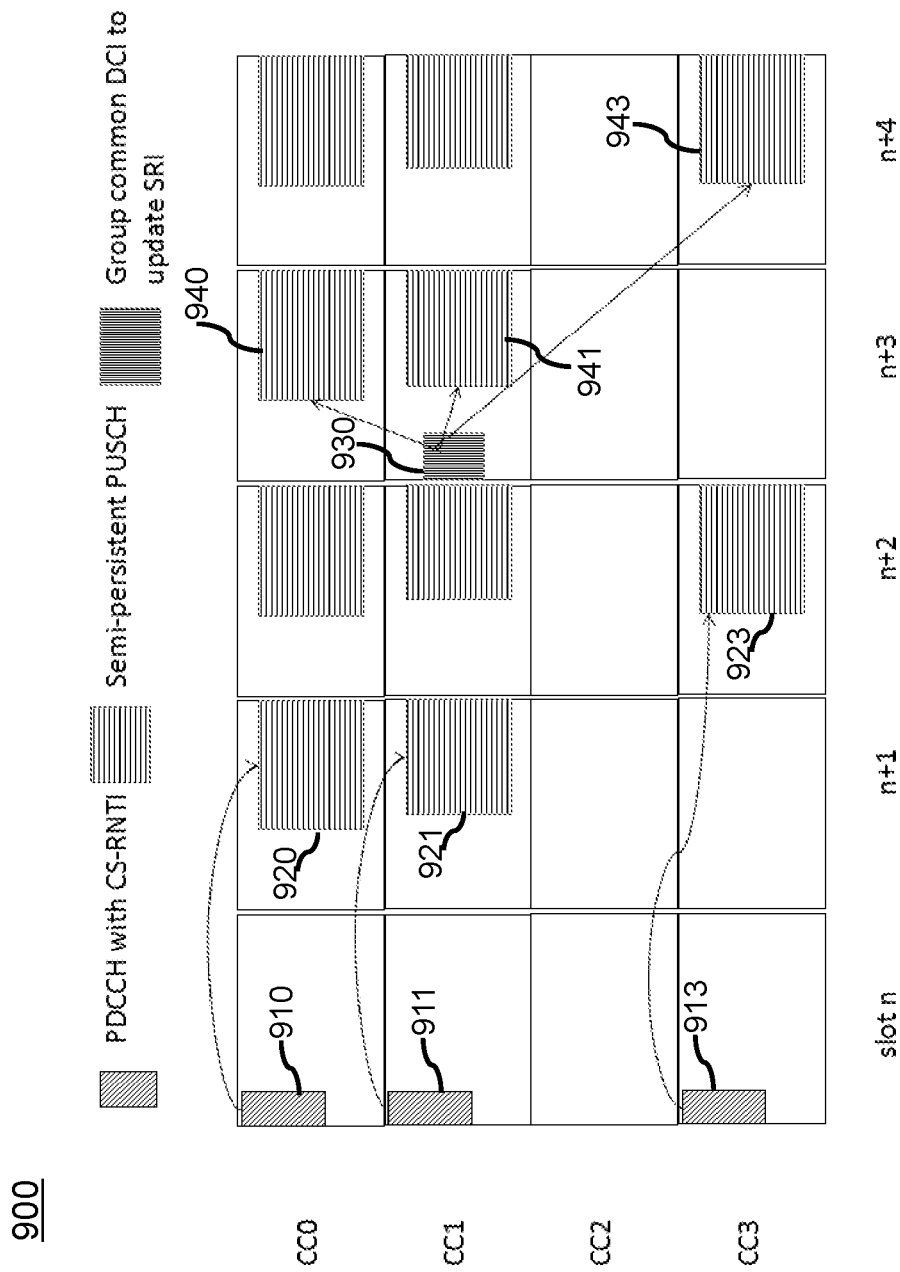
FIG. 9 illustrates an exemplary method for jointly updating SRS resource indicator of a semi-persistent scheduling on multiple carrier components, in accordance with some embodiments of the present disclosure.

FIG. 9 illustrates an exemplary method 900 for jointly updating SRS resource indicator of a semi-persistent scheduling on multiple carrier components, in accordance with some embodiments of the present disclosure. As shown in FIG. 9, the base station updates the beam information of the PUSCH on multiple CCs that have the semi-persistent scheduling PUSCHs 940, 941, 943, by using a group common DCI 930. Further, this group common DCI 930 is dependent on semi-persistent scheduling. That is, if a UE is configured with a semi-persistently scheduled PUSCH, then this group common DCI 930 will be configured for the UE; and if a UE is not configured with a semi-persistently scheduled PUSCH, then this group common DCI 930 will not be configured for the UE. For simplification, the scrambling ID of the group common DCI 930 may be the same as the scrambling ID of the DCI corresponding to the semi-persistently scheduled PUSCH. That is, both scrambling ID are CS-RNTI.

The above method may also be used to inform the TA instead of the SRI, because the TA may also change dynamically on the uplink. The semi-persistently scheduled PUSCH may also include semi-persistent scheduling for CSI feedback, where the DCI scrambling is performed using SP-CSI-RNTI.

In a second embodiment, for downlink semi-persistent scheduling, what is changed dynamically includes not only the beam direction, but also the QCL information. The QCL information is changed by the base station dynamically notifying the TCI. Due to the instability of the channel conditions at high frequencies, the QCL information of the PDSCH transmitted by the base station may need to be dynamically changed. Since the change is dynamic, the base station may need to send a complete DCI every time the TCI needs to be updated, even if other information, such as MCS, DMRS port, HARQ process number, time-frequency domain resource information, etc., does not need to be updated. This causes a waste of the PDCCH, increases the overhead in the PDCCH, and deviates from the purpose of the downlink semi-persistent scheduling. One solution is that for downlink semi-persistent scheduling, the base station updates the QCL information by means of dynamic indication, where the dynamic indication is not based on a semi-persistently scheduled DCI.

Specifically, the base station may update the QCL information of the semi-persistently scheduled PDSCH in the TCI in the non-semi-persistently scheduled DCI field. One solution is that: the base station uses a TCI field in a non-semi-persistently scheduled DCI to update the QCL information of a semi-persistently scheduled PDSCH. Further, the TCI of the semi-persistently scheduled PDSCH is the same as the TCI of the dynamically scheduled PDSCH on the same CC or BWP. Generally, this dynamically scheduled PDSCH refers to a PDSCH scheduled by a C-RNTI scrambled DCI, such as a PDSCH scheduled by DCI format 1_1 scrambled by C-RNTI. In other words, the QCL information of the semi-persistently scheduled PDSCH is based on the TCI of the PDSCH scheduled in the DCI format 1_1 scrambled with the C-RNTI. It can also be said that the base station uses the TCI field in the DCI format 1_1 scrambled by the C-RNTI to simultaneously notify the PDSCH scheduled by the DCI and update the QCL information of the PDSCH with the semi-persistent scheduling. Further, at this point, the two PDSCHs are in the same CC or BWP. After detecting the DCI scrambled by the C-RNTI, the QCL information of the semi-persistent PDSCH is updated. When the TCI field in the DCI format 1_1 scrambled by the C-RNTI indicates two QCL parameter sets (corresponding to two RS sets where each RS set generally includes one or two RS resources), the two QCL parameter sets usually correspond to two DMRS port groups, while the semi-persistently scheduled PDSCH generally only needs one QCL parameter set. Therefore, by default, the first (or the second) QCL set indicated in the TCI field in the DCI scrambled by the C-RNTI may be used to notify the QCL information of the semi-persistently scheduled PDSCH.

Alternatively, the base station can add one or more bits to the C-RNTI scrambled DCI. The at least one bit may be used to update the PDSCH in the DCI scrambled by the CS-RNTI corresponding to the BWP or CC. Further, the base station can add a few bits in the DCI format 1_1 to update the QCL information of the semi-persistently scheduled PDSCH in the corresponding BWP or CC. The corresponding BWP or CC here means that: the BWP or CC where the PDSCH scheduled by the DCI format 1_1 is located is the same as the BWP or CC where the semi-persistent PDSCH is located.

Another method to update the QCL information in semi-persistent scheduling is to jointly notify a user of QCL information of semi-persistent scheduling on multiple CCs and/or BWPs, or to jointly notify multiple users of QCL information of semi-persistent scheduling on one CC and/or BWP; or to jointly notify multiple users of QCL information of semi-persistent scheduling on multiple CC/BWPs. The joint notification may be based on a group common DCI. In other words, one common or public DCI may be used to jointly notify one or more users of QCL information in semi-persistent scheduling on one or more CCs and/or one or more BWPs. Further, this group common DCI is dependent on semi-persistent scheduling. That is, if a UE is configured with a semi-persistently scheduled PDSCH, then this group common DCI will be configured for the UE; and if a UE is not configured with a semi-persistently scheduled PDSCH, then this group common DCI will not be configured for the UE. For simplification, the scrambling ID of the group common DCI may be the same as the scrambling ID of the DCI corresponding to the semi-persistently scheduled PDSCH. That is, both scrambling ID are CS-RNTI. In one embodiment, in order not to increase the type of DCI, this group common DCI can be used to jointly notify the SRI and TCI of semi-persistent scheduling.

Figure 10:
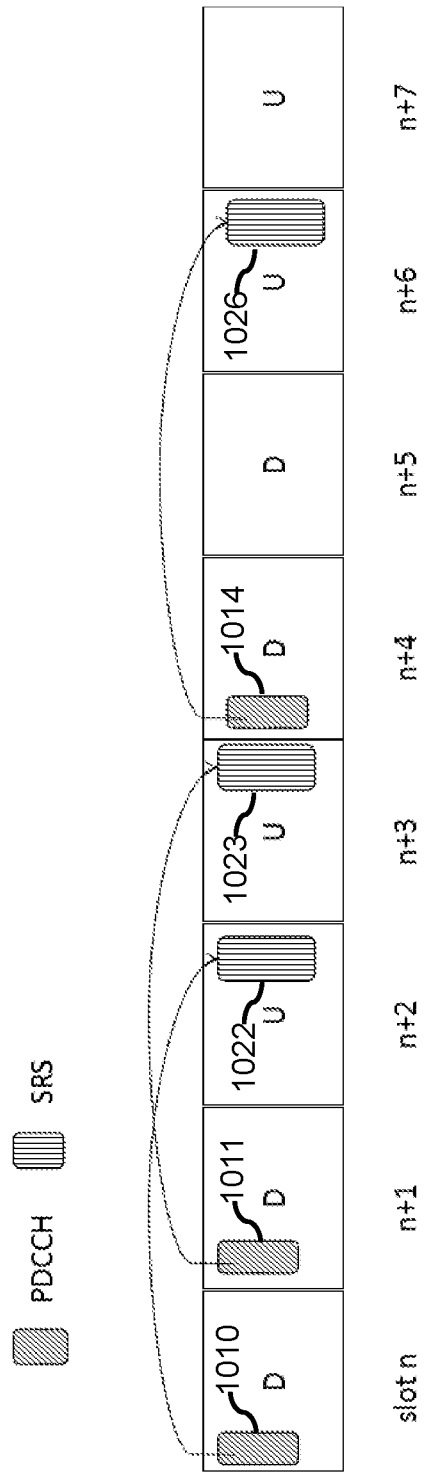
FIG. 10 illustrates an exemplary configuration for a timing offset of a semi-persistent scheduling, in accordance with some embodiments of the present disclosure.

For a third embodiment, the timing offsets of the aperiodic CSI-RS, the aperiodic SRS, the aperiodic CSI feedback, the aperiodic ZP CSI-RS in the NR system are configured semi-statically by RRC. The timing offset represents a time difference between the PDCCH that triggers the aperiodic RS and the actual RS transmission, and is generally in unit of slots. FIG. 10 illustrates an exemplary configuration 1000 for a timing offset of an aperiodic SRS resource set scheduling, in accordance with some embodiments of the present disclosure. As shown in FIG. 10, the slot format configured by RRC signaling is DDUU (assuming symbols in each slot are all downlink or all uplink), with 4 slots as 1 cycle. The timing offset between DCI and its triggered aperiodic SRS is 2 slots. That is, the SRS 1022 triggered by the DCI 1010 on slot n is sent on slot n+2, and the SRS 1023 triggered by the DCI 1011 on slot n+1 is sent on in slot n+1+2=n+3. Since the SRS is transmitted on the uplink slot, when the base station configures the RRC and/or transmits the DCI, the SRS triggered by the transmitted DCI must be sent on the uplink slot. Otherwise it is an incorrect scheduling and configuration. For example, in FIG. 10, if the base station is configured with timing offset=1, then the base station cannot send DCI on slot n to trigger SRS. Otherwise, SRS will be sent on slot n+1, which is not realistic because slot n+1 is a downlink symbol. If the delay problem is not considered, the timing offset=1 is not as good as timing offset=2, because the timing offset=1 causes that the DCIs on the slots n, n+4, etc. cannot trigger the aperiodic SRS, thereby reducing the capacity of the SRS. Therefore, when the slot format is configured by RRC, the base station can configure an appropriate timing offset for the UE according to the configured RRC slot format. For different timing formats, the timing offsets of the aperiodic RS configured to the UE may be different.

Figure 11:
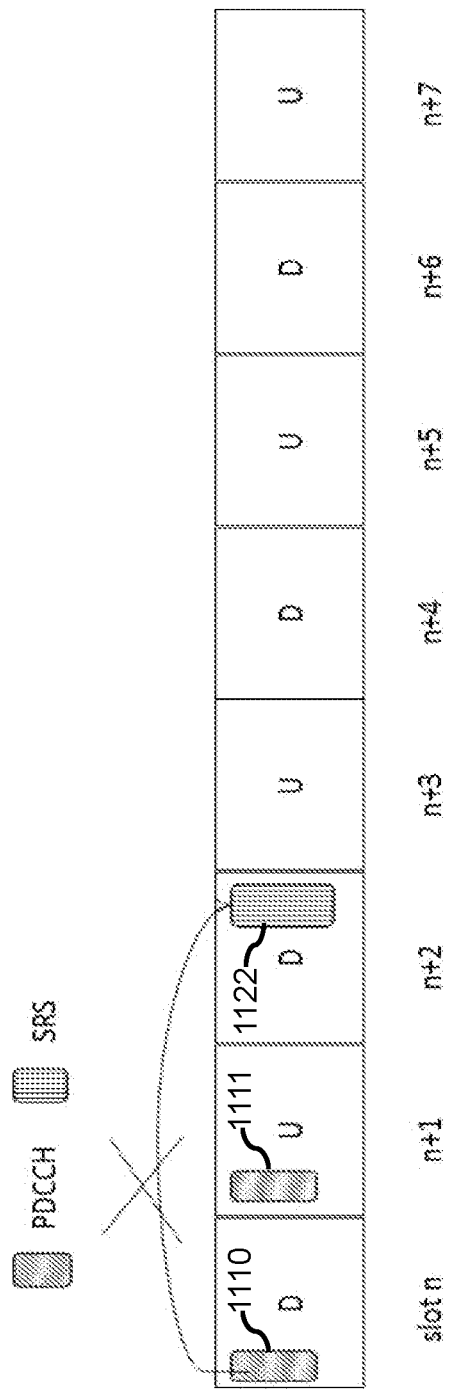
FIG. 11 illustrates another exemplary configuration for a timing offset of a semi-persistent scheduling, in accordance with some embodiments of the present disclosure.

When there is a dynamic slot format configuration indication, e.g., when the DCI format 2_0 is used to notify the slot format configuration, the timing offset configured by the RRC may not match the slot format configuration based on the dynamic notification, resulting in a scheduling limitation of the aperiodic RS, which in turn affects the transmission of the RS. For example, if the base station uses DCI format 2_0 to change the slot format configuration from FIG. 10 to FIG. 11, then the original timing offset configured by RRC is not suitable. As shown in FIG. 11, the originally configured timing offset=2 obviously does not apply to the slot format configuration in FIG. 11. In the example of FIG. 11, other values of timing offset, such as 1 or 3, are suitable. The base station can change the value of the timing offset through RRC signaling. However, since the change of the slot format is notified by the DCI format 2_0, the update by RRC is much slower than the DCI notification. In other words, it is impossible for the base station to use RRC signaling to update the timing offset of the aperiodic reference signal each time the DCI format 2_0 is used to change the slot format, since the RRC cannot be updated as fast as DCI notification.

The timing offset configuration may be dynamically notified in the DCI when triggering the aperiodic RS. In this way, it is necessary to increase the number of bits in the DCI that triggers the RS. These increased number of bits are used to notify the timing offset flexibly. Since the current NR system supports the DCI format 1_1, 0_1, etc. to trigger the aperiodic SRS, and each time a minimum of 1 SRS resource set is triggered, in order to increase the flexibility, the load of the DCI format 1_1, 0_1 needs to be increased, thereby increasing the DCI overhead. In addition, if the SRS request field in a DCI format 1_1 or 0_1 triggers the transmission of multiple aperiodic SRS resource sets, it is difficult to dynamically notify the timing offset of each set by adding overhead in DCI 1_1 or 0_1, because each SRS resource set may require a different timing offset, which makes the overhead of DCI unbearable.

One method of increasing timing flexibility without increasing DCI overhead is to configure multiple timing offsets through high layer signaling for each aperiodic signal, such as an aperiodic RS resource or resource set or resource setting. Each timing offset corresponds to a slot format configuration. Generally, the base station configures a slot format configuration set for a CC through RRC signaling, and the slot format configuration set includes multiple slot format configurations. The base station then uses DCI format 2_0 to pick a slot format configuration from the set to the UE for the CC. In one embodiment, a plurality of timing offsets, e.g. a first set of first timing offsets is configured by a higher layer signaling, where each of the plurality of timing offsets corresponds to a slot format configuration in a set of slot format configurations. When the slot format notification in the DCI indicates an updated slot format configuration, the timing offset of the aperiodic signal is also updated to the timing offset corresponding to the updated slot format configuration.

In the existing NR system, there are several, such as N, slot format indicators in the DCI 2_0. Each slot format indicates a corresponding serving cell or carrier. The purpose is to select a slot format configuration from a slot format configuration set configured for a CC at a higher layer. This set of slot format configurations can be called slotFormatCombinations, which is configured in the high-layer parameter SlotFormatCombinationsPerCell and is used for a certain cell. The configuration set slotFormatCombinations contains several slot format configurations. Each slot format configuration can be called SlotFormatCombination. The slotFormats in each SlotFormatCombination parameter may contain the slot format of one or more slots. The ID of the SlotFormatCombination may correspond to the slot format indication notified in DCI format 2_0. In other words, a slot format indication in DCI 2_0 is used to select a SlotFormatCombination or a slotFormats from the configuration set slotFormatCombinations configured by a high-layer signaling.

For example, as shown in Table 1 below, the values indicated by the slot format are in one-to-one correspondence with the slot format configured at a higher layer. When the values indicated by the slot format notified in the DCI 2_0 are different, the slot format configurations are different. For example, the slot format configurations 0, 1 correspond to the slot format configurations in FIG. 10 and FIG. 11, i.e., DDUU and DUDU, respectively. In order to add flexibility to the timing offset of the aperiodic signal or channel, such as for SRS, CSI-RS, PDSCH scheduling, PUSCH scheduling, PRACH, PUCCH, etc., a timing offset can be configured for each slot format configuration, as shown in Table 1. The timing offset can be at the level of time domain symbol or at the level of the time slot.

TABLE 1

Different slot format configurations corresponding to different timing offsets

| Slot Format Indication | Slot Format Configuration | Timing Offset |
| --- | --- | --- |
| 0 | 0 | T(0) |
| 1 | 1 | T(1) |
| ... | ... | ... |

This timing offset can be considered as the time difference between the DCI that triggers the aperiodic signal and the actual reception or transmission of the aperiodic signal. If the value indicated by the slot format notified in DCI format 2_0 is equal to 0, then the timing offset corresponding to the aperiodic signal is T(0). That is, the aperiodic signal is received or transmitted later than the DCI that triggered the aperiodic signal for a time period of T(0). If the value indicated by the slot format notified in DCI format 2_0 is equal to 1, then the timing offset corresponding to the aperiodic signal is T(1). That is, the aperiodic signal is received or transmitted later than the DCI that triggered the aperiodic signal for a time period of T(1). As such, the timing offset of a certain aperiodic signal changes correspondingly as the time slot format indicated in DCI 2_0 changes.

Figure 12:
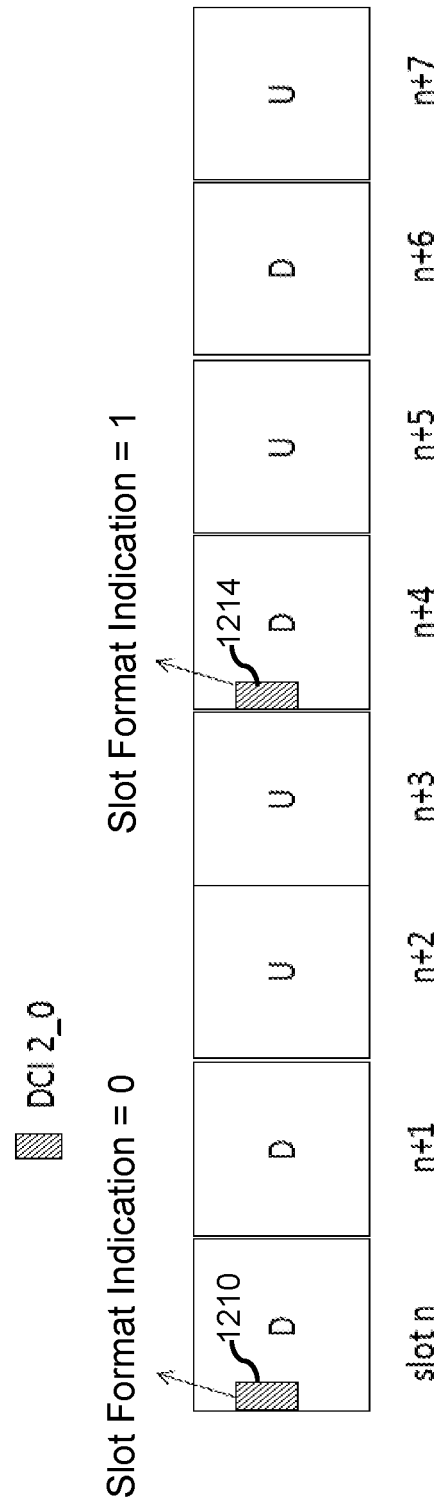
FIG. 12 illustrates an exemplary corresponding relationship between a timing offset and a slot format configuration of an aperiodic signal, in accordance with some embodiments of the present disclosure.

FIG. 12 illustrates an exemplary corresponding relationship 1200 between a timing offset and a slot format configuration of an aperiodic signal, in accordance with some embodiments of the present disclosure. As shown in FIG. 12, when DCI 2_0 1210 indicates slot format indication=0 (corresponding to slot format configuration 0, that is, DDUU) at slot n, then from the time DCI 2_0 1210 is received (i.e., slot n), the slot format becomes DDUU. When DCI 2_0 1214 indicates slot format indication=1 (corresponding to slot format configuration 1, that is, DUDU) at slot n+4, then from the time DCI 2_0 1214 is received (i.e., slot n+4), the slot format becomes DUDU.

In one embodiment, the effective time of the slot format configuration can also be delayed by a period of time from the time when the DCI 2_0 is transmitted. Assuming that in FIG. 12, T(0)=2 slots, T(1)=1 slot, during slots n to n+3, the timing offset of SRS=2 slots. That is, using a DCI on slot n to trigger SRS, then the UE will actually transmit SRS on slot n+2. During slots n+4 to n+7, the timing offset of SRS=1 slot. For example, using a DCI on slot n+6 to trigger SRS, then the UE will actually transmit SRS on slot n+7.

For different aperiodic signals, such as SRS, CSI-RS, CSI reporting, the timing offset configured for a certain slot format may be different. All are configured by RRC signaling, the slot format of DCI 2_0 is used to implicitly and dynamically change the timing offset of these aperiodic signals, which increases flexibility and does not bring any signaling overhead at the physical layer.

In an exemplary SRS, for an aperiodic SRS resource set, the timing offset is a value configured by the RRC signaling under the resource set, that is, the value of the slotOffset. According to the above method, the value of the parameter can be changed to a list or a sequence. That is, the parameter can have N values, which respectively correspond to different slot format configurations. For example, slotOffset is a SEQUENCE(INTEGER(1 . . . 32)). The value of N may be the same as the number of elements in the slot format configuration set. The N values correspond to the N slot format configurations, respectively. When the slot format indicated by DCI 2_0 is configured as i (i<N, and i>=0), the timing offset value in the SRS resource set is the i-th value in slotOffset. In other words, the timing offsets T(0), T(1) . . . in Table 1 are configured under each aperiodic signal, and are configured under the SRS resource set. For the CSI-RS resource set, another set of timing offsets can be configured.

Based on the above method, it is necessary to modify the timing offset parameter configuration of each aperiodic signal from one value to a plurality of values, where each value corresponds to an element in the slot format configuration set. Although the flexibility is very high, the modification of the RRC parameter configuration is relatively large. In one embodiment, a plurality of timing offsets is configured by a higher layer signaling, each timing offset corresponding to a slot format configuration. This plurality of timing offsets is applied to a variety of aperiodic signals, such as SRS, CSI-RS, PDSCH, PUSCH, CSI reporting, etc. For each specific aperiodic signal, the final timing offset is determined based on both the timing offset (e.g. the second timing offset) of the aperiodic signal configured at the higher layer and the timing offset corresponding to the slot format indication notified in DCI format 2_0.

For example, the base station configures N timing offsets through high-layer signaling as shown in Table 1. Each timing offset corresponds to a slot format configuration, such as T(0)=1, T(1)-2. Following a configuration under an existing SRS resource set, slotOffset=2. If the slot format configuration notified in DCI 2_0 corresponds to T(0), then the final timing offset of the SRS resource set is determined by the values of T(0) and slotOffset. For example, the final timing offset is determined based on a sum of the values of T(0) and slotOffset. That is, the final timing offset of the slot=T(0)+slotOffset=1+2=3. If the slot format configuration notified in DCI 2_0 corresponds to T(1), then the final timing offset of the SRS resource set is determined by the values of T(1) and slotOffset. For example, the final timing offset is determined based on a sum of the values of T(1) and slotOffset. That is, the final timing offset of the slot=T(0)+slotOffset=2+2=4. A function other than addition, e.g. subtraction, multiplication, etc. can also be used.

For an aperiodic CSI-RS resource set, if the slot format configuration notified in DCI 2_0 corresponds to T(i), then the final timing offset of the CSI-RS resource set is determined together by the values of T(i) and aperiodicTriggeringOffset, where i>=0 and i<N. If aperiodicTriggeringOffset=3, the final timing offset of the slot=T(i)+aperiodicTriggeringOffset=T(i)+3. In one embodiment, aperiodicTriggeringOffset is a SEQUENCE(INTEGER(1 . . . 4)).

Further, two timing offset sets may be configured by higher layer signaling, where each set includes multiple timing offsets, and each timing offset corresponds to one slot format configuration. This timing offset is applied to a variety of aperiodic signals. The two timing offset sets correspond to the uplink aperiodic signal and the downlink aperiodic signal, respectively. As shown in Table 2, T(i) and T(i)' are applied to the downlink aperiodic signal and the uplink aperiodic signal, respectively.

TABLE 2 different slot format configurations corresponding to different timing offsets, separated by downlink and uplink

| Slot Format Indication | Slot Format Configuration | Timing Offset for Downlink | Timing Offset for Uplink |
|---|---|---|---|
| 0 | 0 | T(0) | T(0)' |
| 1 | 1 | T(1) | T(1)' |
| ... | ... | ... | ... |

For a fourth embodiment, the NR system introduces TRS (Tracking Reference Signal or CSI-RS for tracking), which is a reference signal for fine time-frequency offset compensation. A TRS packet is composed of a CSI-RS resource set, which is a high-layer parameter trs-Info of the CSI-RS resource set. When the base station sends a PDSCH or the like, the PDSCH can be configured with a TCI (transmission configuration indicator) state. The TCI state includes an NZP CSI-RS resource ID, which corresponds to a CSI-RS resource under the TRS packet. The previous TRS packet has been sent, and the UE has obtained the parameters of the time-frequency offset estimation through the TRS packet. For example, the parameters of the time-frequency offset estimation may include: Doppler shift, Doppler spread, average delay, and delay spread. In this way, when demodulating the PDSCH, the UE can directly compensate the demodulation of the PDSCH by using the parameters of the time-frequency offset estimation estimated based on the TRS. Generally, the TRS packet is sent periodically. In one embodiment, the transmission of the TRS packet can be semi-persistent and/or aperiodic.

However, when receiving the TRS itself, the UE needs to perform time-frequency offset compensation on the TRS. This compensation will make the TRS demodulation more accurate. That is, the UE needs to obtain the parameters of the time-frequency offset estimation from a certain reference signal, and then apply these parameters to the TRS reception. A good candidate for this parameter is the SSB (synchronization signal block), because the SSB is sent from the beginning of the cell access, i.e. before the TRS is sent. When the parameters of Doppler shift, Doppler spread, average delay, and delay spread are transmitted, it is generally required that two reference signals are located on the same carrier or BWP. Since the role of the TRS is very important, it is generally configured on each CC or BWP, which means that the SSB needs to be configured on each CC or BWP. The demand for SSB is then very large, especially at high frequencies, where different beams need to be configured with different SSBs. Such a large number of SSBs can cause a very large pilot overhead.

Figure 13:
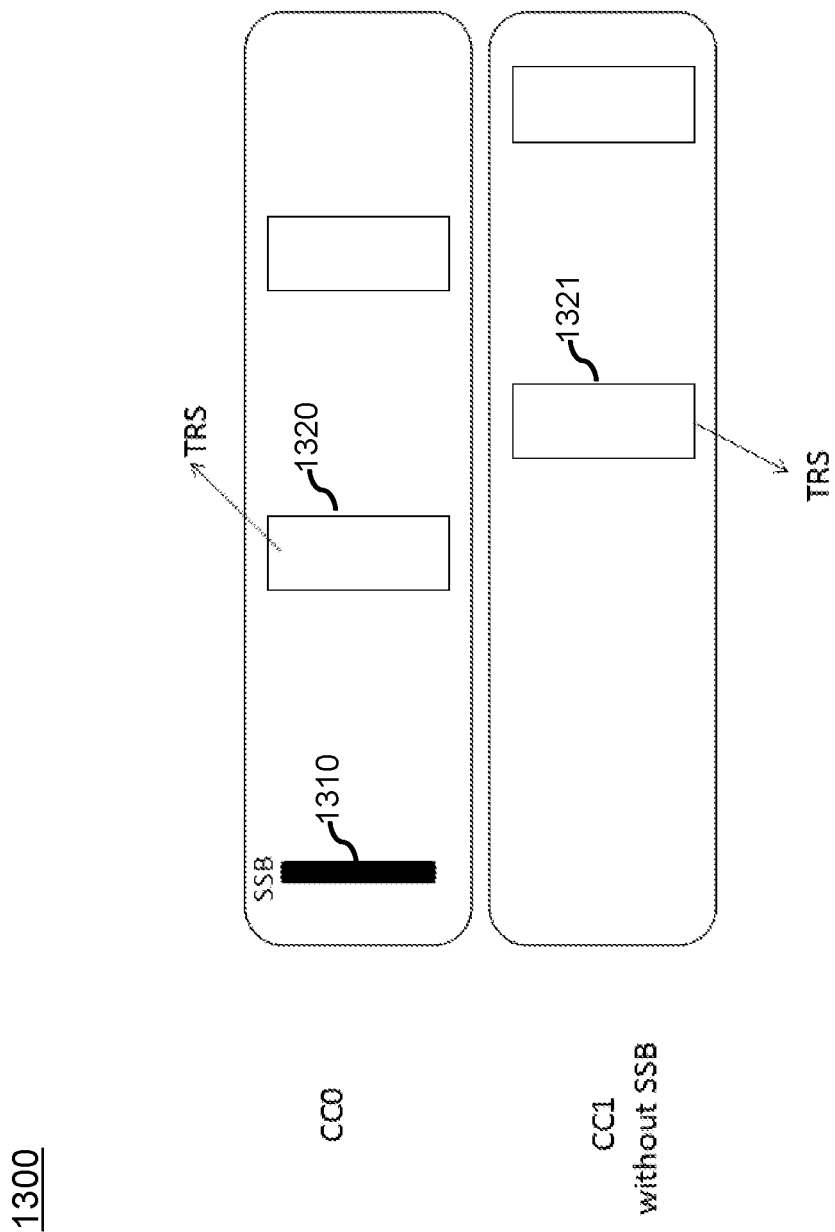
FIG. 13 illustrates an exemplary method for a synchronization signal that provides quasi co-location (QCL) information to a reference signal for tracking, in accordance with some embodiments of the present disclosure.

A method for saving pilot overhead is that: the TCI configured for the TRS includes an SSB, where the SSB and the TRS are located in different carriers or serving cells or BWPs. In addition, the SSB and the TRS share the quasi co-location (QCL) information related to the parameters of the Doppler shift and the average delay. FIG. 13 illustrates an exemplary method 1300 for a synchronization signal that provides QCL information to a reference signal for tracking, in accordance with some embodiments of the present disclosure. As can be seen from FIG. 13, the Doppler shift and average delay parameters of TRS 1320, 1321 on CC0 and CC1 can both come from the SSB 1310 on CC0. In this way, there is no need to send the SSB on CC1, which can greatly save the overhead of SSB. Since the SSB and TRS may not be on the same carrier or BWP, the parameters of the Doppler spread and the delay spread may not be the same. But the TRS can obtain the parameters of the Doppler shift and the average delay from the SSB.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, the method comprising:
    generating at least one indicator of scheduling information for a first transmission with a semi-persistent scheduling, the scheduling information comprising information related to at least one of: a sounding reference signal resource indicator, a transmission configuration indicator, and a timing advance; and
    transmitting the at least one indicator to at least one wireless communication device, wherein the at least one indicator is carried by a physical downlink control channel signal that schedules a second transmission with a dynamic scheduling.

2. The method of claim 1, wherein:
    the at least one indicator is further configured for updating scheduling information for the second transmission.

3. The method of claim 1, wherein the transmitting the at least one indicator comprises:
    transmitting a dedicated channel signaling to carry a plurality of indicators to a plurality of wireless communication devices, wherein at least one of the plurality of indicators is configured for each of the plurality of wireless communication devices.

4. The method of claim 3, wherein the dedicated channel signaling is a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

5. The method of claim 1, further comprising:
    transmitting a dedicated channel signaling to carry a plurality of indicators for a plurality of data transmissions, wherein resources of at least two of the plurality of data transmissions are different in terms of at least one of: carrier component (CC) and bandwidth part (BWP).

6. The method of claim 5, wherein the dedicated channel signaling is a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

7. A method performed by a wireless communication device, the method comprising:
    receiving at least one indicator from a wireless communication node; and
    updating, based on the at least one indicator, scheduling information for a first transmission with a semi-persistent scheduling, the scheduling information comprising information related to at least one of: a sounding reference signal resource indicator, a transmission configuration indicator, and a timing advance,
    wherein the at least one indicator is carried by a physical downlink control channel signal that schedules a second transmission with a dynamic scheduling.

8. The method of claim 7, further comprising:
    updating, based on the at least one indicator, scheduling information for the second transmission.

9. The method of claim 7, wherein the first transmission and the second transmission are in at least one of: a same carrier component (CC) and a same bandwidth part (BWP).

10. The method of claim 7, wherein the receiving at least one indicator comprises:
    receiving, from the wireless communication node, a dedicated channel signaling that carries a plurality of indicators for a plurality of wireless communication devices, wherein at least one of the plurality of indicators is configured for each of the plurality of wireless communication devices.

11. The method of claim 10, wherein the dedicated channel signaling is a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

12. The method of claim 7, further comprising:
    receiving, from the wireless communication node, a dedicated channel signaling that carries a plurality of indicators for a plurality of data transmissions, wherein resources of at least two of the plurality of data transmissions are different in terms of at least one of: carrier component (CC) and bandwidth part (BWP).

13. The method of claim 12, wherein the dedicated channel signaling is a downlink control information (DCI) that is scrambled by at least one of: a configured scheduling radio network temporary identifier (CS-RNTI), a cell RNTI (C-RNTI), a semi-persistent channel state information RNTI (SP-CSI-RNTI), and a newly defined dedicated RNTI.

14. A wireless communication node comprising:
    at least one processor configured to generate at least one indicator of scheduling information for a first transmission with a semi-persistent scheduling, the scheduling information comprising information related to at least one of: a sounding reference signal resource indicator, a transmission configuration indicator, and a timing advance; and
    a transceiver configured to transmit the at least one indicator to at least one wireless communication device, wherein the at least one indicator is carried by a physical downlink control channel signal that schedules a second transmission with a dynamic scheduling.

15. A wireless communication device comprising:
    a transceiver configured to receive at least one indicator from a wireless communication node; and
    at least one processor configured to update, based on the at least one indicator, scheduling information for a first transmission with a semi-persistent scheduling, the scheduling information comprising information related to at least one of: a sounding reference signal resource indicator, a transmission configuration indicator, and a timing advance, wherein the at least one indicator is carried by a physical downlink control channel signal that schedules a second transmission with a dynamic scheduling.

\* \* \* \* \*